Dec. 13, 1955     O. E. HUSE     2,726,479
LOBSTER TRAP
Original Filed Nov. 13, 1948     2 Sheets-Sheet 1
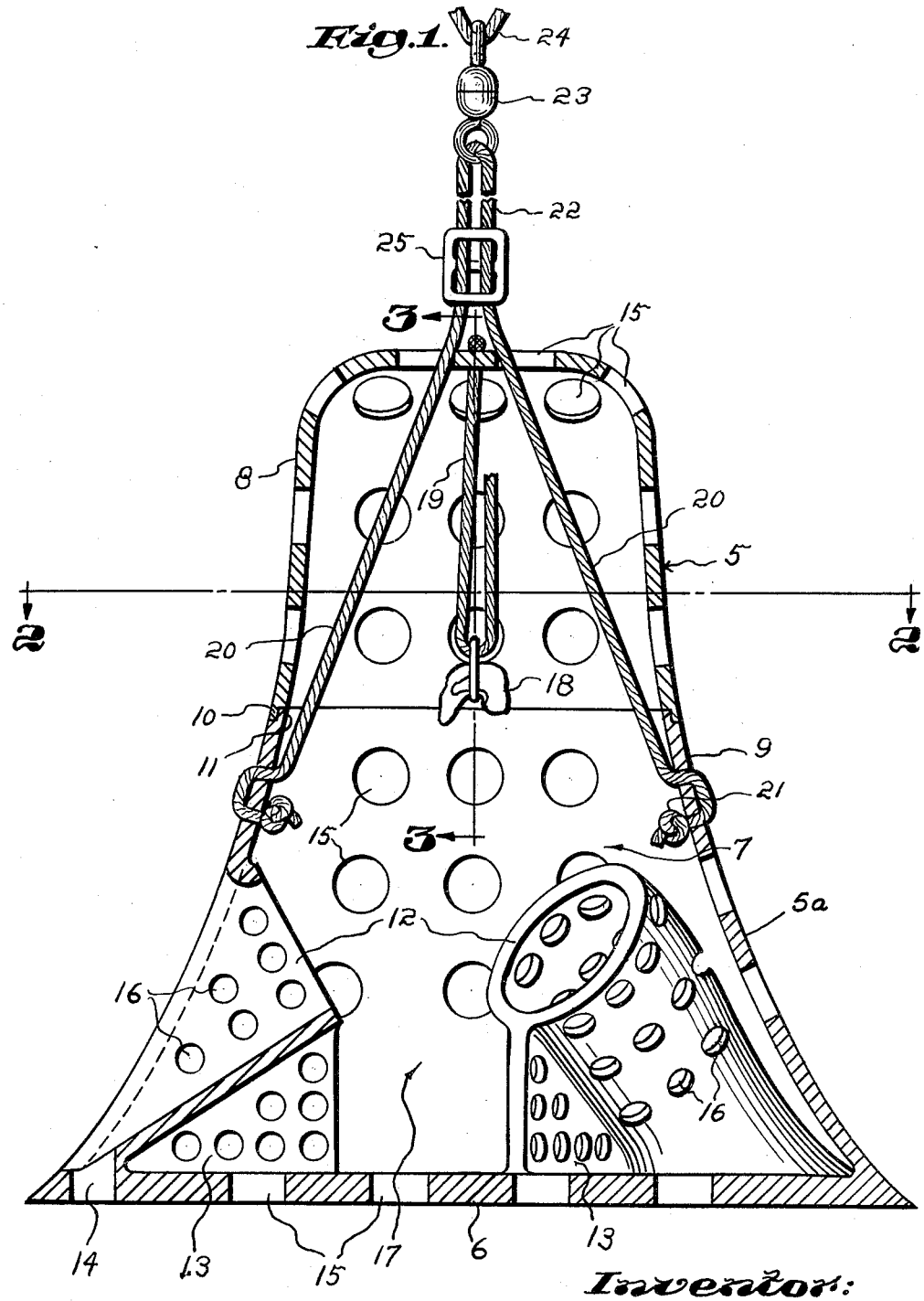
Inventor:
Oscar E. Huse,
by Spear & Spear
Attorneys Dec. 13, 1955  O. E. HUSE  2,726,479
LOBSTER TRAP
Original Filed Nov. 13, 1948  2 Sheets-Sheet 2
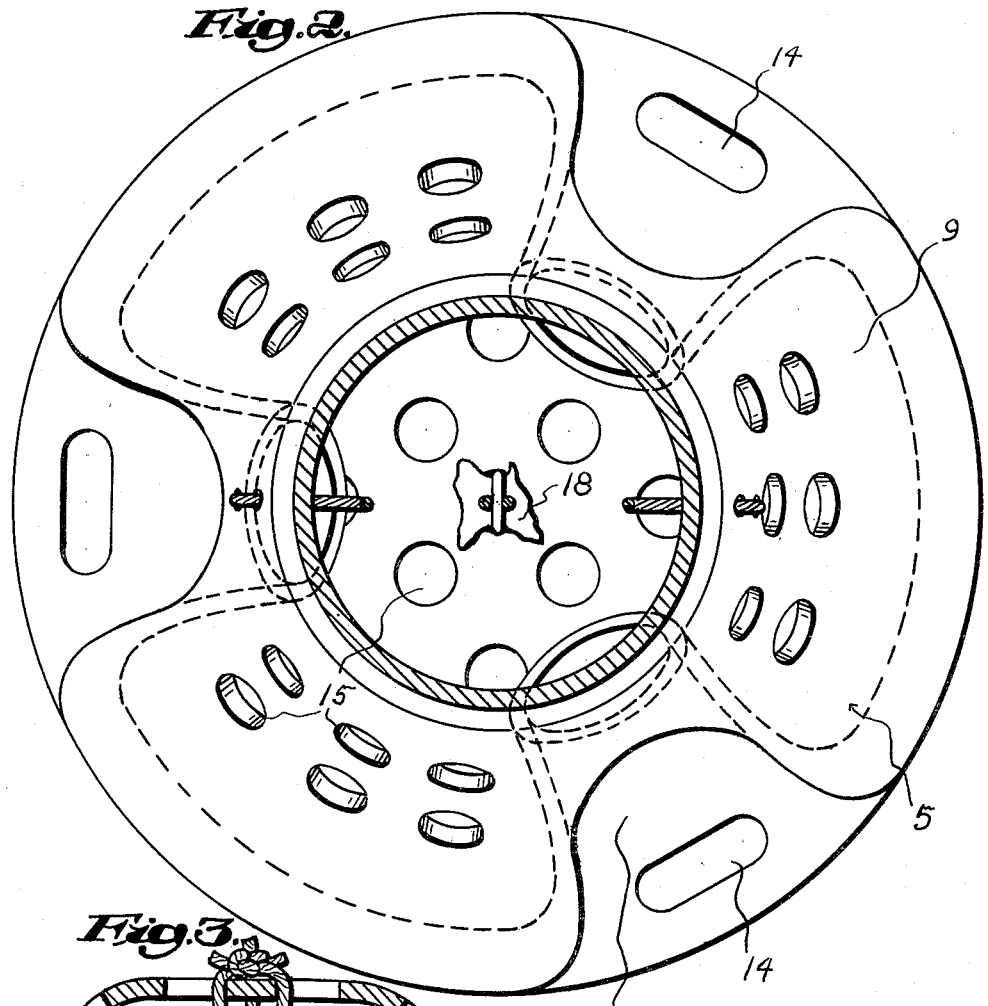
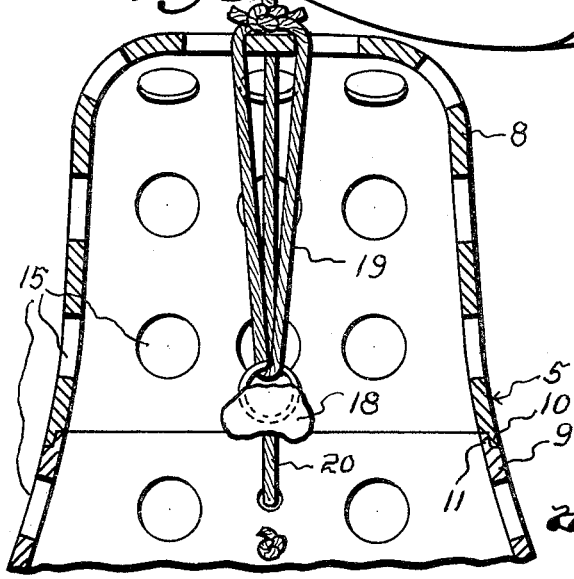
Inventor:
Oscar E. Huse,
by Spear & Spear
Attorneys

United States Patent Office 2,726,479
Patented Dec. 13, 1955

2,726,479

LOBSTER TRAP

Oscar E. Huse, Kents Hill, Maine, assignor of one-half to Erle S. Huse, Rochester, N. Y.

Continuation of abandoned application Serial No. 59,890, November 13, 1948. This application July 19, 1954, Serial No. 444,118

7 Claims. (Cl. 43—100)

This invention relates to lobster traps and has for its objectives the provision of a more serviceable and effctive trap than those of the type universally employed by lobster fishermen. The present application is a continuation of my co-pending application, Serial No. 59,890, filed November 13, 1948, now abandoned.

For many years, lobster traps have been constructed by interconnecting wooden sills and bows by means of spaced wooden laths. These, when completed, had woven heads that enabled lobsters to enter the traps but made it difficult for them to escape therefrom. Such traps are rock or otherwise ballasted so that, when baited, they sink to the bottom with the location of each trap being marked by a buoy attached to it by means of a so-called "warp" line.

A thus constructed lobster trap has the inherent objectionable feature that the closely spaced laths result in the trap having so much resistance to water currents that, during storms, it is smashed against rocks and either lost or so damaged that it has to be rebuilt. This factor explains the present necessity for annually replacing a high percentage, estimated as high as 70%, of all lobster traps in use and it cannot be avoided by increasing the spacing of the laths since it is necessary to safeguard against the entrapped lobsters catching and damaging their large claws between laths with consequent loss of market value.

Other objections to lobster traps of the long accepted construction relate to their effectiveness. In spite of their being ballasted, they frequently settle improperly to the ocean bottom or later become upset. This is believed to be the reason why many well located traps are unproductive. In addition, it is impossible to estimate how many lobsters that enter any trap escape therefrom due to the fact that the conventional trap does not afford entrapped lobsters any hiding place without which they are constantly active.

In accordance with the invention, a lobster trap is provided which has a hollow body provided with a vertical wall or a floor to which the lower end of the wall is marginally joined. The lower part of the wall has at least one entrance head and at least a portion of that lower part, in a zone extending at least partway about the body, is downwardly and outwardly inclined and defines with the subjacent part of the floor, a marginal hideout for lobsters entrant of the trap to encourage them to remain quiet thereby to minimize the possibility of their escape or injury. The hideout establishing part of the wall is of imperforate and light excluding stock and the remainder of the body has a plurality of apertures.

The body apertures are of such size and shape as to preclude the possibility of their affording means by which a caught lobster might injure itself. Their total area, in relation to that of the body of the trap is, however, such that the trap, particularly when approximately in the shape of a bell, has minimum resistance to water currents. The floor is, preferably, relatively thick and heavy thus to serve as a weight means by which the proper position of the trap is more readily assured and better maintained.

The trap has means enabling the warp line to be connected thereto, usually centrally of its top. Preferably, each trap consists of upper and lower sections and such means may serve to detachably interconnect the trap sections to enable entrapped lobsters to be removed from the bottom section and the trap to be rebaited. The bait may conveniently be suspended in the upper section so that it is positioned above and between the upper ends of the heads.

In the accompanying drawings, there is shown an illustrative embodiment of the invention from which these and other of its novel features and advantages will be readily apparent. In the drawings:

Fig. 1 is a vertical, central section through a trap in accordance with my invention.

Fig. 2 is a section along the lines 2—2 of Fig. 1, and

Fig. 3 is a fragmentary vertical section at a right angle to that of Fig. 1.

In the embodiment of the invention shown in the drawings, there is generally indicated at 5 a hollow, bell-shaped body whose outwardly concave wall 5ª is closed at its mouth by a relatively thick and heavy floor 6 to establish a parlor 7. The body wall 5ª consists of upper and bottom sections 8 and 9, respectively provided with complemental joint establishing portions 10 and 11, respectively. While traps in accordance with the invention may be made from any desired stock, it is desirable that such stock be resistant to the attack of salt water and be sufficiently yieldable to avoid injury on contact with rocks.

Adjacent the floor 6, the bottom section 9 has a plurality of spaced heads 12. While the heads 12 may be of any desired construction and may be separately made and attached to the body 5, they taper inwardly and are preferably upwardly and inwardly inclined with their inner ends spaced from each other and from the floor 6. Where the heads 12 are molded integrally with the body 5, they may be connected to the floor 6 by webs 13. In practice, the entrance to each head 12 is, in part, defined by a portion of the floor 6 and that portion is apertured as at 14 to establish a hand grip to enable the fisherman to pull the trap inboard when it has been lifted from the water.

The wall 5ª, the body 5, and the floor 6 are provided with a multiplicity of apertures 15. While the shape of the trap reduces its resistance to water currents, the apertures 15, while each of such small size as to make it impossible for a lobster to catch and injure a claw therein, have a combined area that is substantial relative to the area of the trap and reduce to a minimum its water resistance. The heads 12 are also provided with apertures 16 and these have the added function of affording grips for lobsters seeking to enter the trap. The apertures 15 are, however, spaced from the junction of the body 5 and the floor 6 a sufficient distance to establish a marginal, darkened chamber or hideout 17 in which caught lobsters may hide. With a hiding chamber, entrapped lobsters remain quiet with less fighting among them.

While the bait 18 may be elsewhere located, it is shown as suspended as at 19 from the upper body part 8 to be positioned above and between the upper ends of the heads 12.

In order that the body parts 8 and 9 may be locked together when the trap is ready for use or separated to enable caught lobsters to be removed from the bottom body part 9, or the bait 18 replaced, a flexible connector is shown as having its ends 20 extending downwardly through a pair of apertures 15 adjacent the center of the upper body section 8 and anchored as at 21 to diametrically opposite portions of the bottom body part. The connector thus establishes an exposed loop 22 centrally of the top of the trap carrying a swivel connection 23 to receive the warp line, indicated at 24. This arrangement not only serves to minimize the possibility of a trap settling to the bottom in an improper position or becoming upset, but also reduces snagging of the warp line to a minimum.

The loop 22 is of sufficient length to enable the upper body part 8 to be slid therealong to permit access to its interior and to the interior of the bottom body part 9 and it is shown as slidably supporting a buckle element 25 through which the loop 22 is threaded so that when the connector is tensioned, the element 25 is locked in a position holding the body parts together while enabling the element 25 to be slid into an inoperative position by relieving the tension on the connector.

It will be thus apparent that lobster traps in accordance with the invention are well adapted to meet the requirements of lobster fishermen since they are both more serviceable and more effective than the type of lobster trap now universally employed.

What I therefore claim and desire to secure by Letters Patent is:

1. A lobster trap comprising a hollow body provided with a vertical wall and a floor to which the lower end of said wall is marginally joined, said wall including a plurality of spaced entrance heads in its lower part, at least a portion of said lower part being outwardly and downwardly inclined and defining with the subjacent part of the floor a marginal hideout for lobsters entrant of said trap, the hideout establishing part of said wall being of imperforate and light excluding stock and the remainder of said body having a plurality of apertures.

2. A lobster trap comprising a hollow body provided with a vertical wall and a floor to which the lower end of said wall is marginally joined, said wall including at least one entrance head in its lower part, at least a portion of said lower part being outwardly and downwardly inclined through a zone extending at least part way about said body and defining with the subjacent part of the floor a marginal hideout for lobsters entrant of said trap, the hideout establishing part of said wall being of imperforate and light excluding stock and the remainder of said body having a plurality of apertures.

3. A lobster trap comprising a hollow body provided with a vertical wall and a floor closing one end of said wall and which includes a plurality of spaced entrance heads adjacent said floor, at least the lower portion of said wall being downwardly and outwardly inclined and joining said floor at an acute angle and being of imperforate and light excluding stock thereby to establish a marginal, darkened hiding area for lobsters entrant of said trap, the remainder of said body having a plurality of apertures.

4. A lobster trap comprising a hollow, approximately bell-shaped body having an outwardly concave wall, a large end and a smaller end and a floor closing said large end, at least the lower part of said wall being downwardly and outwardly inclined and joining said floor at an acute angle and including an entrance head, said body being of imperforate light excluding stock for a substantial distance above said floor to define an annular darkened hiding area for entrapped lobsters, the remainder of said body having a plurality of apertures.

5. A lobster trap comprising a hollow body provided with a vertical wall and a floor closing the lower end of said body, and a plurality of spaced entrance heads extending upwardly into said body from a point adjacent said floor, said wall between said floor and a horizontal plane approximately inclusive of the lower part of the inner ends of said heads being of imperforate light excluding stock and thereabove having a plurality of apertures, said wall below said plane being inclined outwardly and downwardly and joining said floor at an acute angle.

6. A lobster trap comprising a hollow body approximately in the shape of a bell and provided with a vertical wall and a floor closing one end of said wall, said floor meeting the lower end of said wall at an acute angle, said wall including at least one entrance head adjacent said floor, said wall centrally of its upper end having openings for use in attaching a line to the trap by which it may be hauled and lowered, the upper part of said wall having a plurality of apertures of such size and shape as to enable large streams of water to circulate through the trap but to prevent the escape of lobsters, the remainder of said wall being of imperforate and light excluding material, and said floor being of sufficient mass so as to constitute a weight means to prevent said trap from being upset by ocean currents when resting on the ocean bottom.

7. A lobster trap comprising a hollow body approximately in the shape of a bell and provided with a vertical wall and a floor to which the lower end of said wall is marginally joined, said wall including a plurality of spaced entrance heads in its lower part, said wall having openings in its upper end for use in attaching a line to the trap by which it may be suspended in an upright position while being hauled and lowered, at least a portion of said lower part being outwardly and downwardly inclined through a zone extending at least part way about said body and defining with the subjacent part of the floor a marginal hideout for lobsters entrant of said trap, the hideout establishing part of said wall being of imperforate and light excluding stock and the remainder of said body having a plurality of apertures of such size and shape as to enable large streams of water to circulate through the trap but to prevent the escape of lobsters, and said flow being of sufficient mass so as to constitute a weight means to minimize the possibilities of said trap being upset by ocean currents when resting on the sea bottom.

No references cited.